US006427321B2

(12) United States Patent
Fedato et al.

(10) Patent No.: US 6,427,321 B2

(45) Date of Patent: Aug. 6, 2002

(54) AUTOMATIC DECKING AND AUTOMATIC FASTENING SYSTEM

(75) Inventors: Rino A. Fedato, Courtice; John Campbell, Markham, both of (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/273,854

(22) Filed: Mar. 22, 1999

(51) Int. Cl.[7] .................................................. B23P 21/00

(52) U.S. Cl. ............................ 29/787; 29/784; 29/799; 29/281.5; 29/464

(58) Field of Search .......................... 29/784, 799, 783, 29/787, 791, 795, 281.5, 464, 430, 897.2, 429, 771, 823

(56) References Cited

U.S. PATENT DOCUMENTS 4,693,358 A 9/1987 Kondo et al. ............ 198/339.1
4,734,979 A * 4/1988 Sakamoto et al. ............ 29/430
4,893,402 A * 1/1990 Hirasaka et al. .............. 29/784
4,928,386 A * 5/1990 Schupp et al. ................ 29/798
5,014,405 A * 5/1991 Yamana et al. ............... 29/784
5,014,602 A * 5/1991 Iwata .......................... 92/117
5,027,502 A * 7/1991 Sakamoto et al. ............ 29/783
5,088,176 A * 2/1992 Koga .......................... 29/430
5,111,988 A 5/1992 Strickland ................... 228/102
5,123,161 A * 6/1992 Kubo et al. .................. 29/784
5,191,707 A * 3/1993 Sasamoto et al. ............. 29/783
5,513,428 A * 5/1996 Shiramizu et al. ............ 29/783
5,586,377 A * 12/1996 Katsuta et al. ............... 29/91.5
5,873,165 A * 2/1999 Bode et al. ................ 29/897.2
5,940,961 A * 8/1999 Parete ......................... 29/784
6,109,424 A * 8/2000 Doan .......................... 29/430

* cited by examiner

*Primary Examiner*—S. Thomas Hughes
*Assistant Examiner*—Marc Jimenez
(74) *Attorney, Agent, or Firm*—Jeffrey A. Sedlar

(57) ABSTRACT

A vehicle assembly system automatically decks and automatically fastens body components to chassis components. The system uses an automatic decking and fastening unit that includes a base with an elevatable platform repositionable relative to the base by at least one actuator. A slidable unit carries a fastener driver, is supported on the elevatable platform, and is repositionable relative to the elevatable platform by at least one other actuator. The slidable unit also carries an arm that is repositionable relative to the slidable unit by yet another actuator. A pair of conveyors are positioned away from the base, are movable relative to the base and carry a pair of vehicle components. The conveyors are cycled so that the vehicle components are positioned relative to one another in a predetermined position, and the actuators are operated to reposition the fastener driver to a position determined by engagement of the slidable unit with one of the vehicle components.

18 Claims, 11 Drawing Sheets

50
51
58
61
45
53
60
57
45
52

16
15
51
53
15'
16'

17
50
46
55
52
51
53
56
46'
17'

AUTOMATIC DECKING AND AUTOMATIC FASTENING SYSTEM

TECHNICAL FIELD

The present invention relates to an automatic vehicle component assembly system, and more particularly, to an automatic decking and automatic fastening (ADAF), apparatus and method that effects automatic decking and automatic fastening of vehicle body components to vehicle chassis components.

BACKGROUND OF THE INVENTION

One of the most impressive operations in a vehicle assembly plant involves the marriage of a vehicle body structure to its chassis. For a pick-up truck, this process is generally subdivided into assembly of the passenger cab to the frame and assembly of the utility box to the frame. Commonly used methodology involves a substantial reliance upon manual intervention to accomplish this complex task. In the case of a pick-up cab, a subassembly that can weigh in the neighborhood of 1200 pounds (545 kilograms), is supported by equipment and manually guided into position to align or "justify" the cab relative to the frame, before lowering it onto the frame to effect decking. In addition, manpower is used to guide the machinery that individually applies the fasteners for securing the components together. Automating this type of vehicle assembly process is highly desirable due to the labor intensive and physically demanding operations involved.

SUMMARY OF THE INVENTION

Aspects of the present invention involve automation of the process that decks and secures a vehicle body component to its chassis. In accordance with these aspects, an automatic decking and automatic fastening system includes a base with an elevatable unit repositionable relative to the base by at least one actuator. Preferably, the elevatable unit is compliant in the fore-aft direction. This preferred fore-aft compliance is useful in accommodating any experienced chassis carrier stopping error. A cross-car slidable unit is supported on the elevatable unit and is repositionable relative to the elevatable unit by at least one other actuator. Preferably, this other actuator can stop and hold position when an element of the chassis such as a frame bracket has been located. Tooling (referred to in the following detailed description of the preferred embodiment as an ADAF plate), is carried on the slidable unit and is repositionable vertically relative to the slidable unit by yet another actuator. The tooling locates off the chassis element and serves to carry and to justify the body component to the chassis. A fastener driver is preferably carried by a compliant assembly on the slidable unit. This assembly allows the fastener driver to have a preferred compliance in the cross-car and fore-aft directions relative to the slidable unit, and allows the fastener driver, with its own lead in tooling, to locate a mounting fastener.

According to preferred aspects of the present invention, the body element is positioned in space at a predetermined location. The actuators are operated to reposition the tooling to accept and justify the body element to a position determined by engagement of the tooling with the chassis. The justified body element is lowered to the chassis, the tooling is retracted, and the fastener driver advances fastening the body element to the chassis.

BRIEF DESCRIPTION OF THE DRAWINGS

The present invention will now be described, by way of example, with reference to the accompanying drawings in which.

DESCRIPTION OF THE PREFERRED EMBODIMENT

Figure 1:
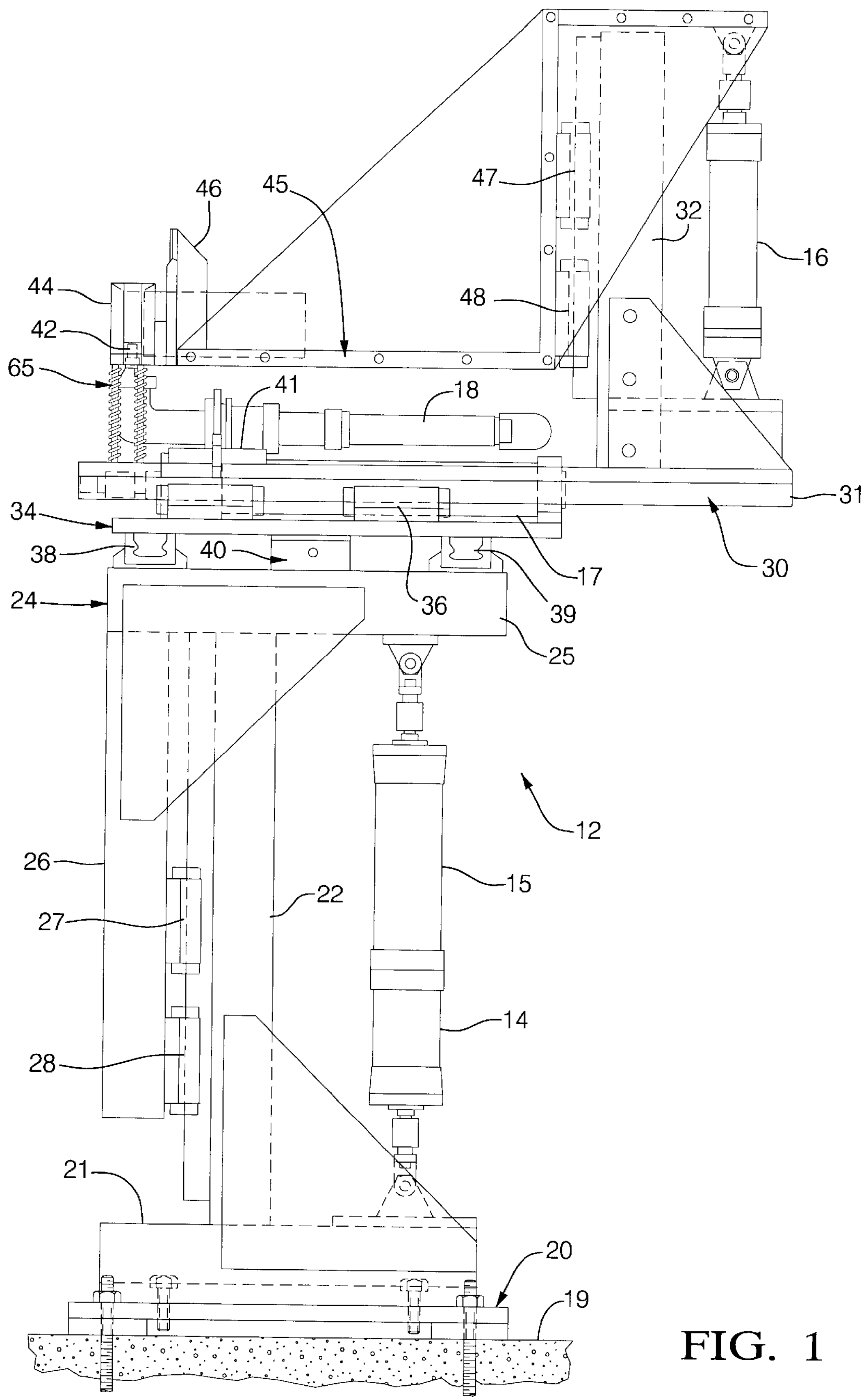
FIG. 1 is an illustration of one side of the cab to frame marriage station of an ADAF apparatus showing one ADAF unit.

Referring to the drawings, illustrated in FIG. 1 is one fixture, referred to as ADAF unit 12, of an automatic decking and automatic fastening system 10. Generally, the ADAF unit 12 is operable to position fastener driver 18 relative to a first vehicle component (not shown in FIG. 1), and to position a second vehicle component relative to the first vehicle component. This is accomplished by operation of a plurality of actuators designated as cylinders 14–17, which are pneumatic in the present embodiment. The ADAF unit 12 is described within the application of assembling a pick-up cab to its frame, but is useful in the assembly of many types of vehicle body components to their associated vehicle chassis components.

More specifically, ADAF unit 12 includes a base assembly 20 that is anchored to foundation 19 in a conventional manner. The base assembly 20 includes a horizontal structure 21 that supports vertical riser 22, with a gusset fixed between the two for added rigidity. An elevatable unit 24 is carried by the base assembly 12 and includes a platform 25 and a vertical leg 26 each fixed to another gusset. A pair of bearings 27 and 28 are positioned between the vertical riser 22 and the vertical leg 26 permitting relative vertical movement there-between. The elevatable unit 24 is positioned vertically relative to the base assembly 20 by a joined pair of actuators designated as cylinder 14 and cylinder 15. Cylinder 14 includes an extensible rod that is connected to base assembly 20 and cylinder 15 includes an extensible rod that is connected to elevatable unit 24. By selectively varying the power fluid pressure in cylinders 14 and 15, the vertical position of the elevatable unit 24 relative to the base assembly 20 is automatically varied to carry out the operations of the ADAF system 10.

A slidable unit 30 is carried by the platform 25 and includes a base plate 31 and an upwardly extending vertical arm 32 with a gusset fixed there-between. A slide assembly 34 is positioned between the base plate 31 and the elevatable unit's platform 25. To position the slidable unit 30 in the cross-car direction relative to the vehicle being assembled, the slide assembly 34 includes a pair of bearings 35 and 36 along with an actuator in the form of cross-car cylinder 17 that has an extensible rod connected to the slidable unit 30. To allow positionability of the slidable unit 30 in the fore-aft direction relative to the vehicle being assembled, the slide assembly 34 includes a pair of bearings 38 and 39 along with a well known type of spring centering mechanism 40 that extends between the slide assembly 34 and the elevatable platform 25. Bearings 35, 36, 38 and 39 in combination with cylinders 14, 15 and 17, and centering mechanism 40 enable omnidirectional positionability of the slidable unit 30 including base plate 31, relative to the base assembly 20.

The end effector assembly 65 of the ADAF system 10 includes a power operated fastener driver 18 of a type well known in the art that is carried by a compliant assembly 41 on the slidable unit 30, and exhibits an upwardly facing rotating tool 42 that is disposed within a spring loaded guide 44. The compliant assembly 41 is of a well known type and allows the fastener driver to be compliant in the cross-car and fore-aft directions relative to the slidable unit through the use of elements that are displaceable under force, such as springs. This compliance allows the fastener driver, with its own lead in tooling, to move into alignment while locating the cab mount screw. The rotating tool 42 is selectively positioned along with the slidable unit 30 in an automatic manner. In addition, the fastener driver 18 is operated automatically during procedures of the ADAF system 1O. This automatic fastening system for the fastener driver records the product sequence number and all cab mount torques for quality assurance and flags any non conformities for correction to specification.

A decking arm 45 is also carried on the slidable unit 30 and includes tooling, referred to as ADAF plate 46, that is vertically movable relative to the rotating tool 42. Bearings 47 and 48 are positioned between the decking arm 45 and the vertical arm 32 of slidable unit 30. A cylinder 16 extends between slidable unit 30 and decking arm 45 providing the motive force for vertically positioning the decking arm 45 and the ADAF plate 46 relative to platform 25. The ADAF plate 46 justifies the cab to the chassis frame and includes an angled top surface to facilitate locating on the cab 51. When cylinder 16 is retracted, the ADAF plate 46 is positioned relatively close to the rotating tool 42. This allows the cab to be decked to the chassis frame and the fastener driver to re-engage the chassis frame to fasten the cab screws.

Figure 2:
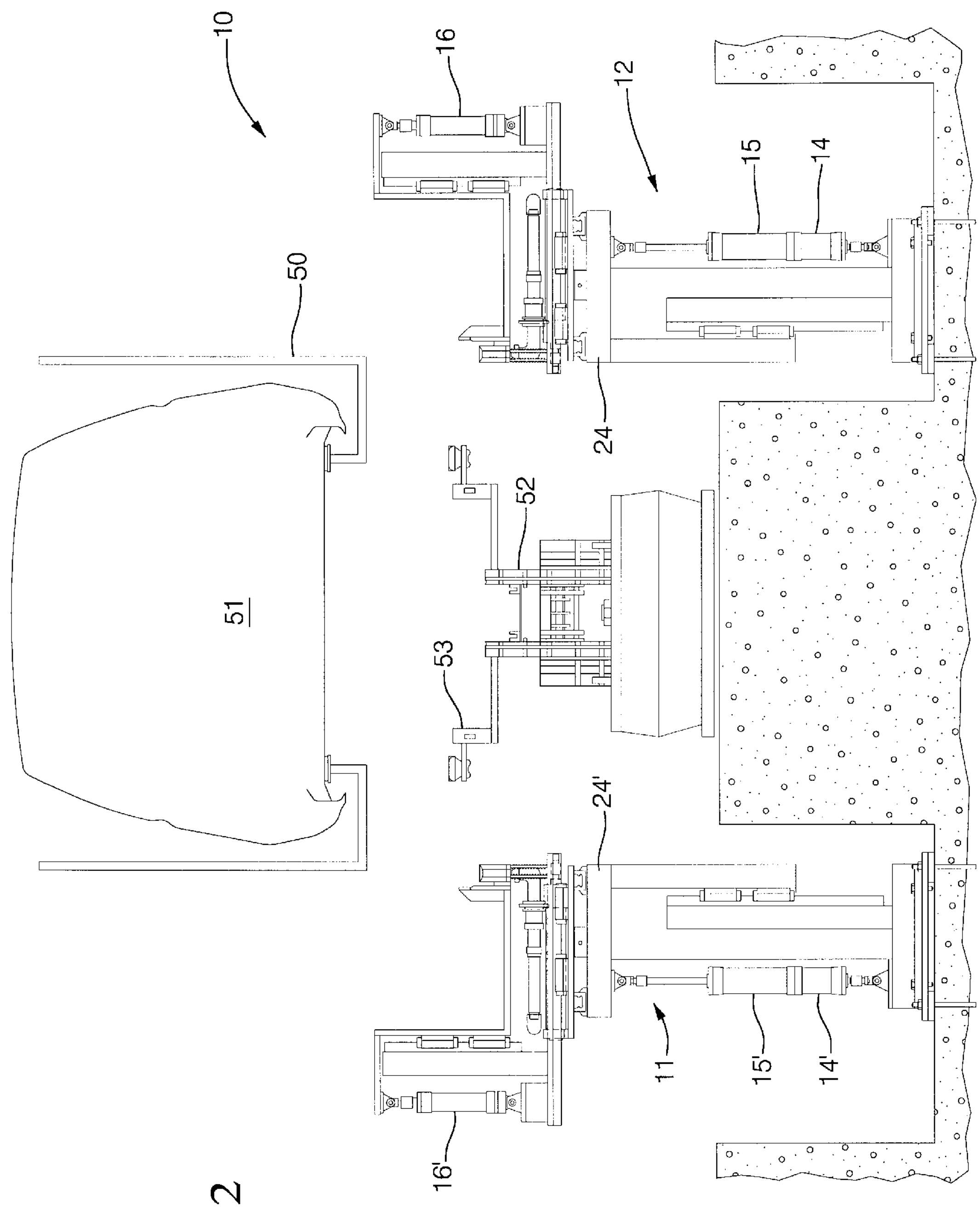
FIG. 2 is an illustration of the cab to frame marriage station of an ADAF apparatus with both ADAF units shown in an initial stage of the marriage sequence.

Referring to FIG. 2, it can be seen that the ADAF unit 12 is one of two substantially identical mirror-image ADAF units 11, 12 included in the cab to frame marriage station of ADAF system 10. In FIGS. 2–10 the gusset plates of ADAF units 11 and 12 are removed for improved clarity. Additionally, components of ADAF unit 11 that are like those of ADAF unit 12, carry the same numerical designation with the addition of a prime symbol. Above the ADAF units 11 and 12, a marriage transfer 50 supports cab 51, and operates to lower the cab 51 onto the ADAF units 11 and 12. Preferably, a trim conveyor (not illustrated), initially carries the body components and a chassis conveyor 52 carries the chassis component. The trim and chassis conveyors are alternatively shuttled along the same path. The cab and the utility box (not illustrated), are lifted from the trim conveyor and repositioned above the ADAF units 11 and 12 relative to one another in a predetermined position by the marriage transfer 50. Between the ADAF units 11 and 12, chassis conveyor 52, which is of a conventional type such as an automatically guided vehicle, supports a frame 53, and operates to bring the frame 53 into position relative to the ADAF units 11 and 12. In the present process sequence stage, the cab 51 is positioned prior to being lowered, and the frame 53 is positioned between the ADAF units 11 and 12. To initiate an automatic decking and fastening system cycle, a signal to begin prompts operation of the cylinders 15 and 15', which extend to full stroke as shown, raising the elevatable units 24 and 24'. At this stage cylinders 14, 14', 16, 16', 17 and 17' are fully retracted. In this position the Marriage station is ready to place the cab 51 onto the ADAF units 11 and 12.

Figure 3:
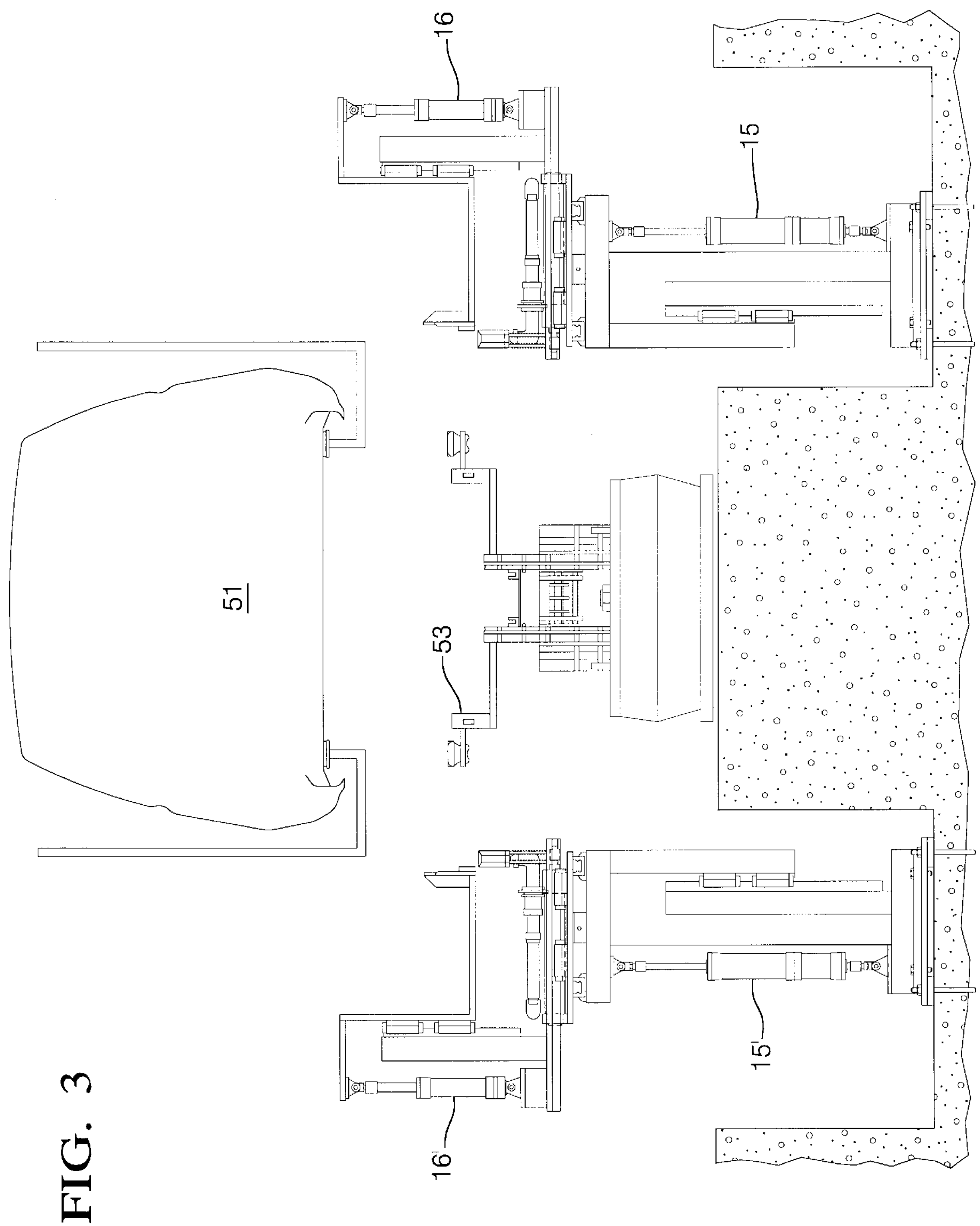
FIG. 3 is an illustration of the cab to frame marriage station of an ADAF apparatus shown in an operative stage of the marriage sequence with the ADAF units ready to locate off the chassis frame.
Figure 4:
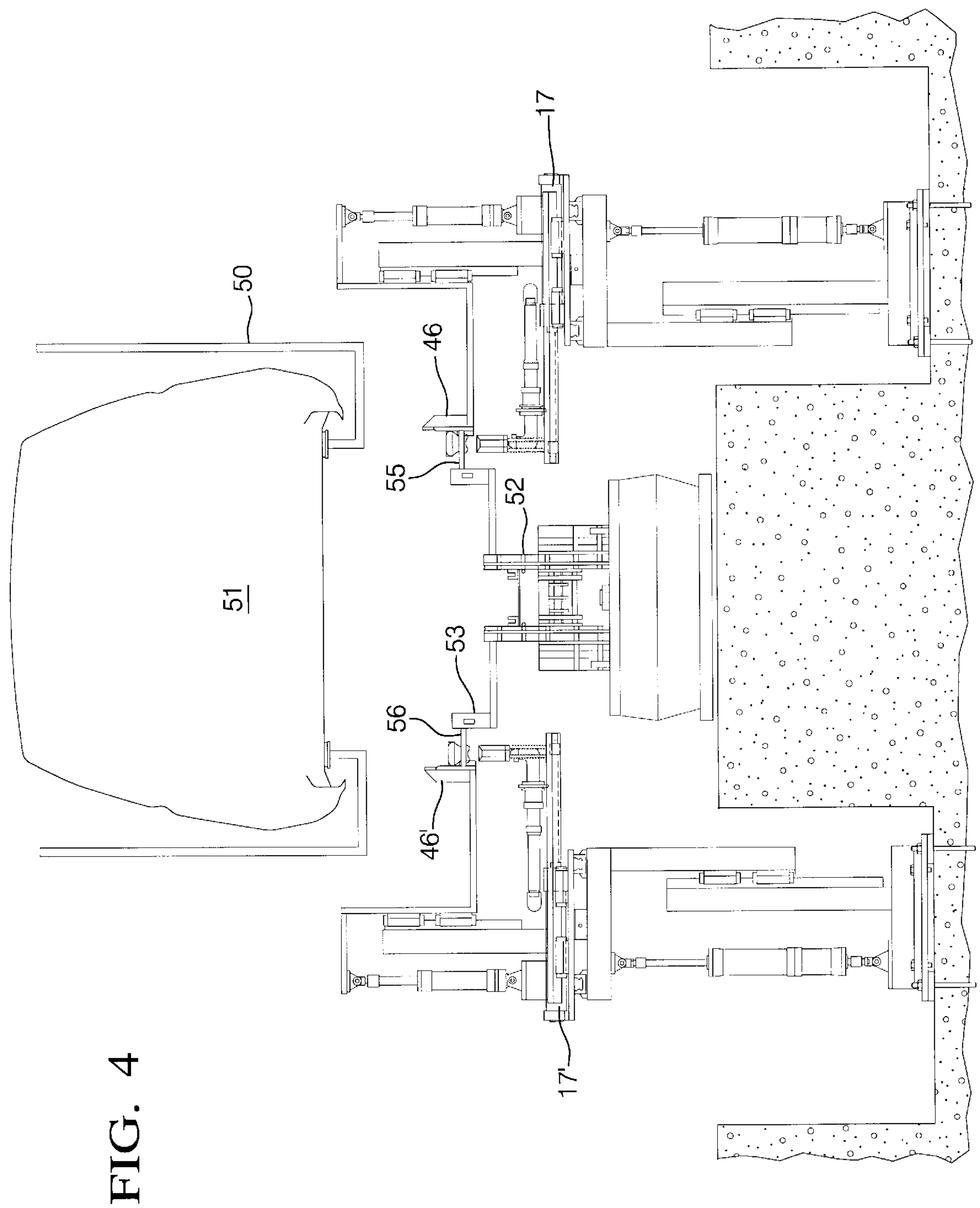
FIG. 4 is an illustration of the cab to frame marriage station of an ADAF apparatus shown in an operative stage of the marriage sequence with the ADAF units located off the chassis frame and the cab in a pre-deck position.

Referring to FIG. 3, when the cylinders 15, 15' are fully extended a signal is sent to prompt cylinders 16, 16' to extend to full stroke, at which point the ADAF units 11 and 12 are ready to locate the chassis frame. As shown in FIG. 4, when the cylinders 16, 16' are fully extended and the chassis conveyor is in position, a signal is sent to prompt cross-car cylinders 17, 17' to extend to a stall condition occurring when ADAF plates 46, 46' are positioned against chassis frame brackets 55, 56. At the stall position, cylinders 17, 17' are locked in place. Optionally, movement of the cylinders 15, 15', 16, 16', 17 and 17' may occur simultaneously or in any sequence to effect location of the ADAF units 11 and 12 to the desired position, with the ADAF plates 46, 46' engaging brackets 55, 56. The sequence depends on the line of attack that is open, which is dictated by the specific shape of the product being married together. The ADAF plates 46, 46' are prepared to accept the cab 51 from the marriage transfer 50 and justify it to a position determined by engagement of the ADAF plates with the cab and with the brackets 55, 56.

Figure 5:
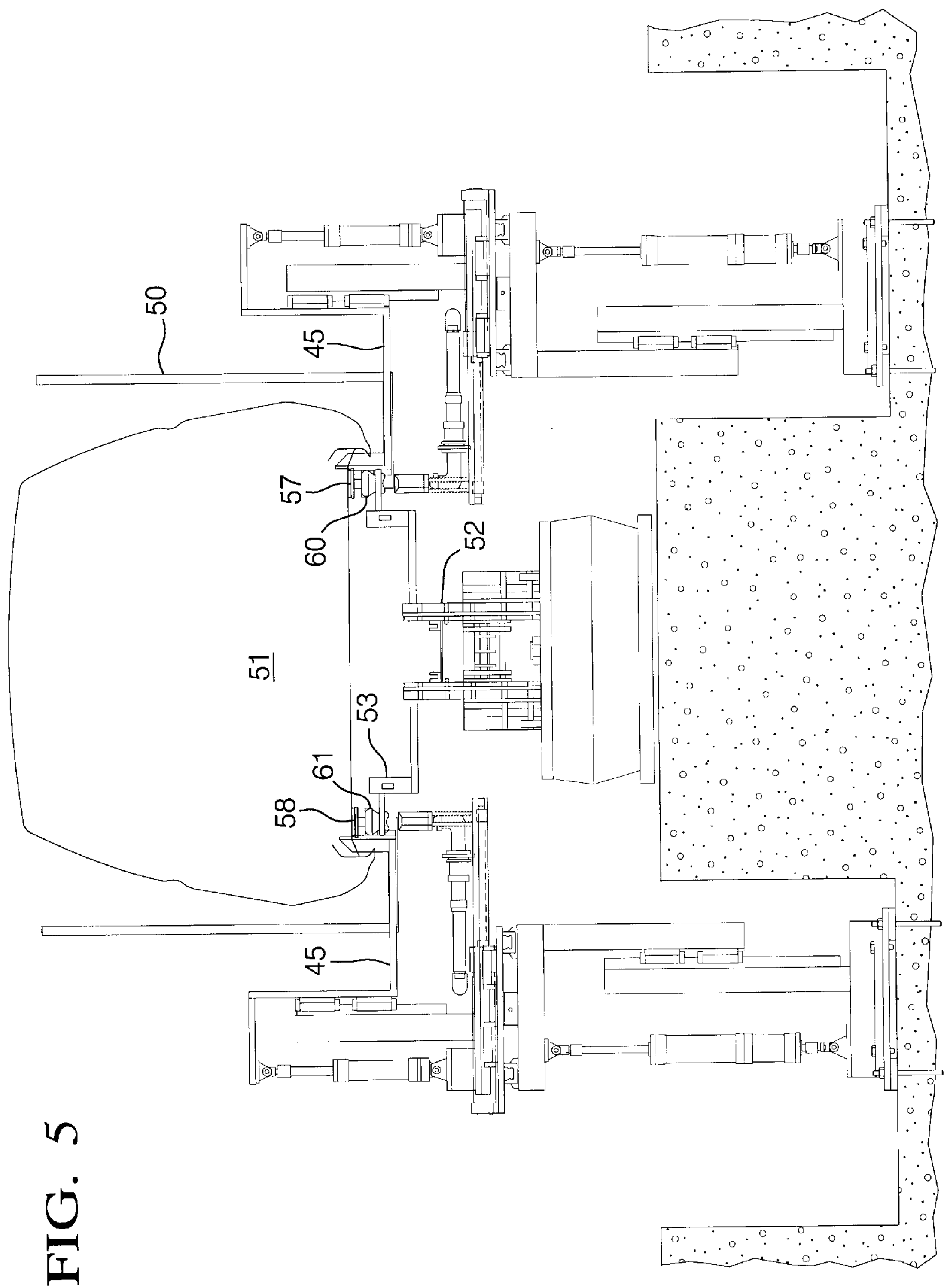
FIG. 5 is an illustration of the cab to frame marriage station of an ADAF apparatus shown in an operative stage of the marriage sequence wherein the cab transfer has landed the cab onto the ADAF plates, and the cab is now justified to the chassis frame via the ADAF plates.
Figure 6:
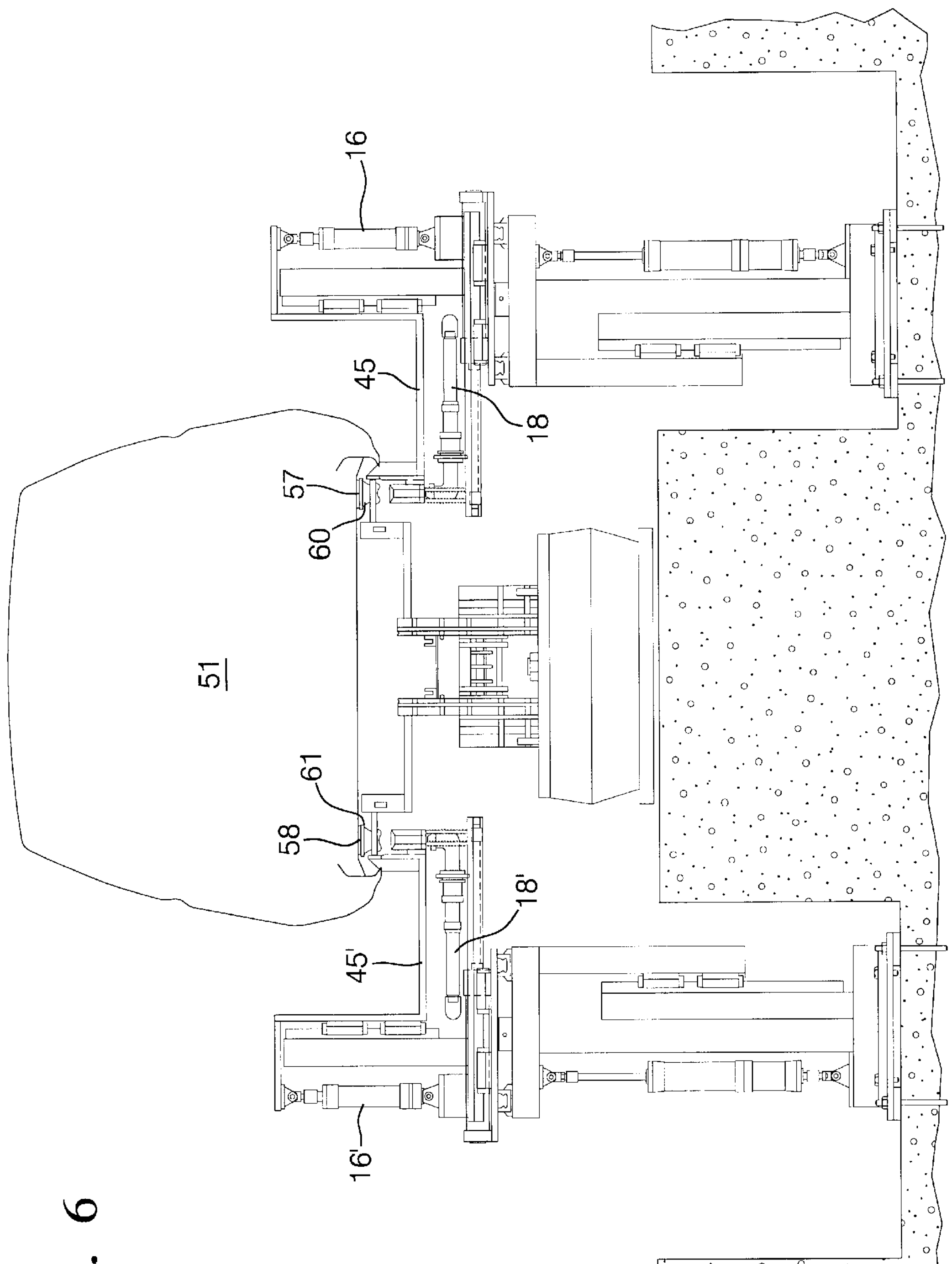
FIG. 6 is an illustration of the cab to frame marriage station of an ADAF apparatus shown in an operative stage of the marriage sequence wherein the cab has been lowered onto the chassis frame and the ADAF plates are being retracted.
Figure 7:
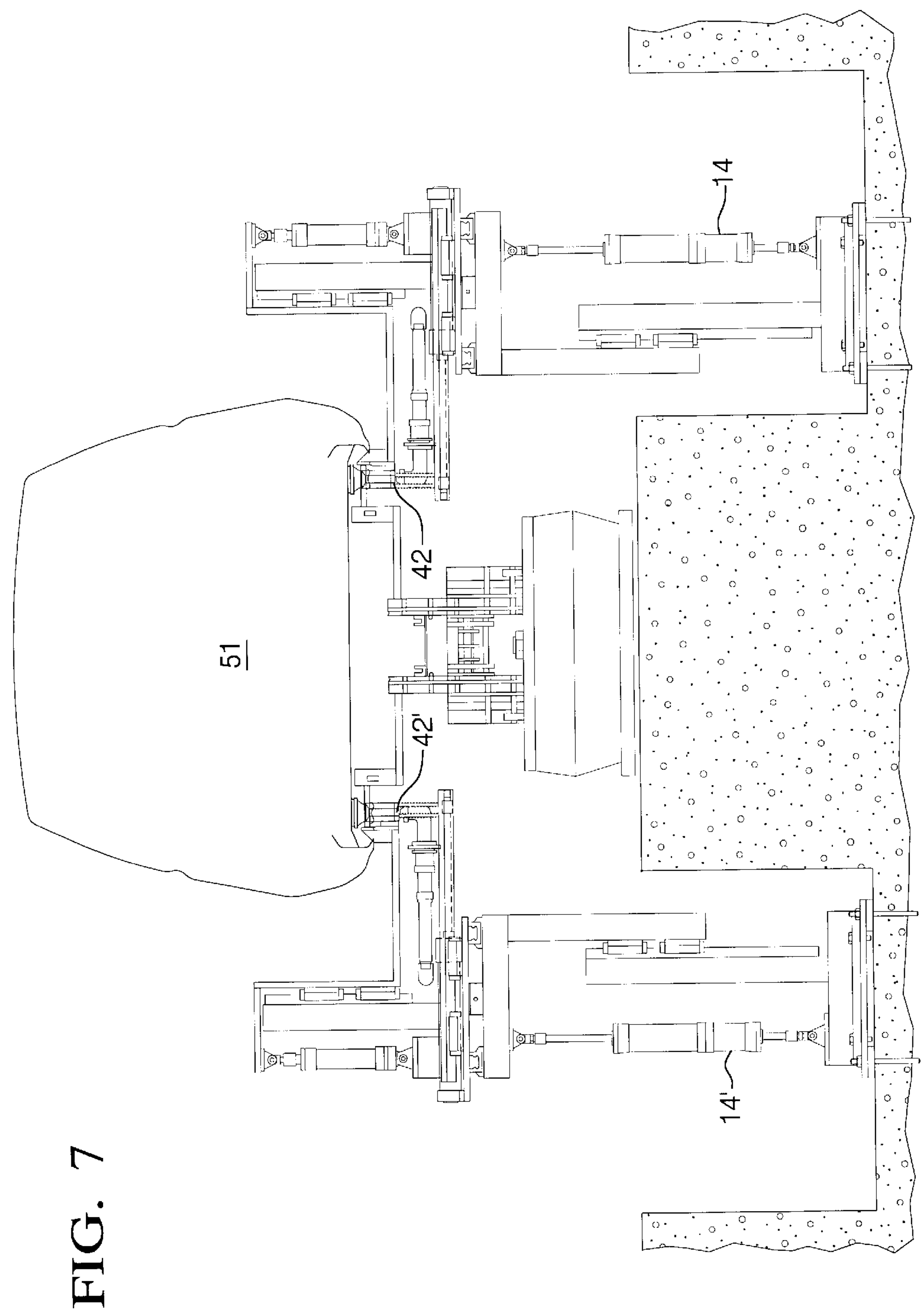
FIG. 7 is an illustration of the cab to frame marriage station of an ADAF apparatus shown in an operative stage of the marriage sequence wherein the fastener drivers advance to fasten the cab screw.

Referring to FIG. 5, the next stage involves marriage transfer 50 lowering cab 51 onto ADAF plates 46, 46' of the decking arms 45, 45', which receive and carry the cab 51. In this position, the cab's bearing plates 57, 58 are aligned with the mounts 60, 61 of the frame 53, with the end effectors of the ADAF units 11 and 12 positioned below the mounts 60, 61. Referring to FIG. 6, cylinders 16, 16' are fully retracted so that the decking arms 45, 45' lower the cab 51. The bearing plates 57, 58 rest on the mounts 60, 61 respectively, decking the cab 51 to the frame 53. At this point a signal is sent to initiate operation of the fastener drivers 18, 18' at a slow speed. Referring to FIG. 7, the cylinders 14, 14' are extended so that the rotating tools 42, 42' engage the fasteners. As the fastener drivers start to drive the cab screws, the fastener drive torque increases to a level which causes the fastener controlling system to trip to high speed, rapidly driving the fasteners. When a preset torque is reached, the fastener drivers stop rotating and a signal is sent to retract cylinders 14, 14'.

Figure 11:
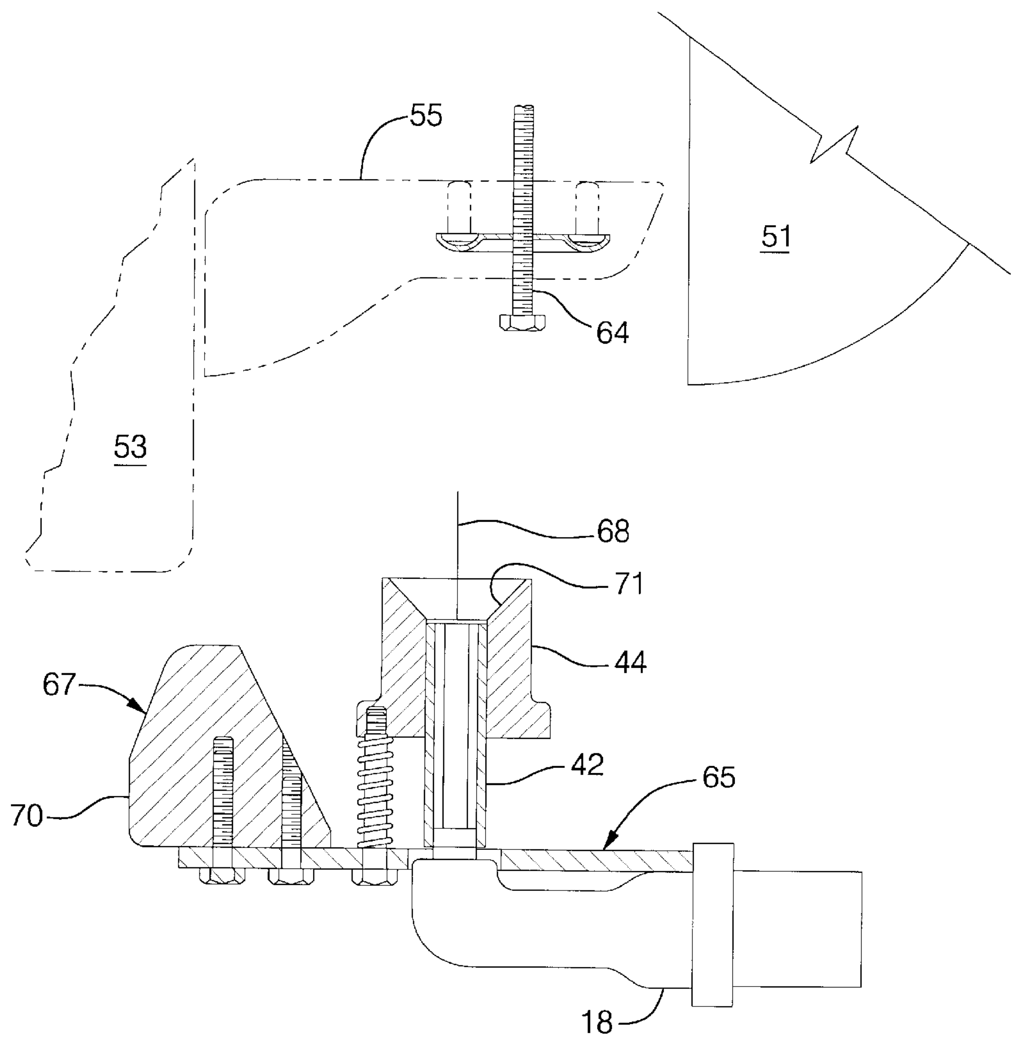
FIG. 11 is a fragmentary schematic illustration of the end effector tooling usable with the cab to frame marriage station of the ADAF apparatus shown in FIGS. 1–10, illustrated in a disengaged position.
Figure 12:
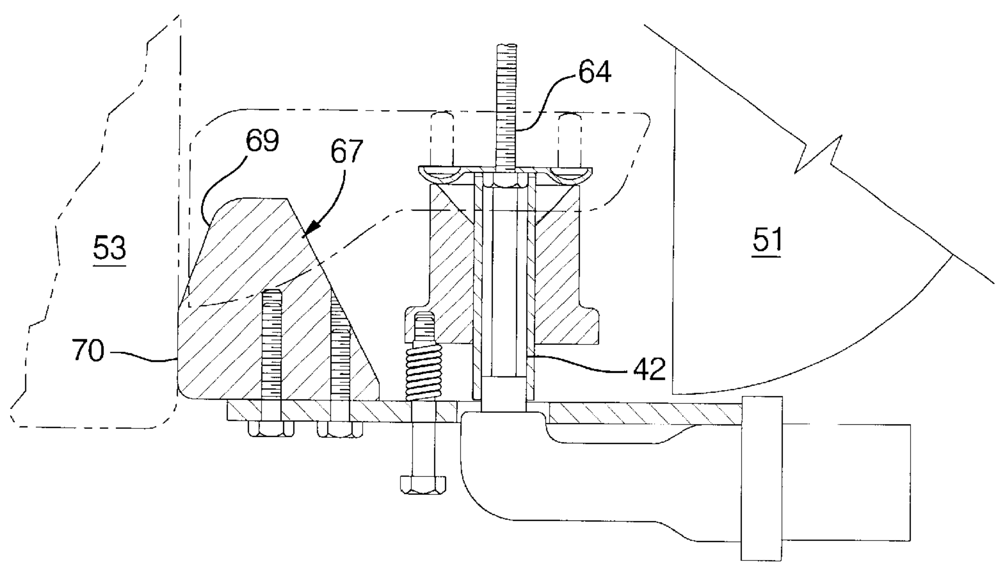
FIG. 12 is a fragmentary schematic illustration of the end effector tooling of FIG. 11 shown in an engaged position.

Reference is directed to FIGS. 11 and 12 to clarify operation of the end effector tooling. A preferred mechanism for locating the fastener drivers relative to the fasteners is shown in a simplified schematic manner. Bracket 55 is rigidly connected to frame 53 and is preassembled with a fastener 64. The end effector assembly 65 includes fastener driver 18, spring loaded guide 44, and locator 67. In its initial position, the axis 68 of rotating tool 42 is not aligned with the fastener 64, but is positioned slightly inboard therefrom. As cylinder 14 is extended, the locator 67 engages the side rail of frame 53. Locator 67 includes an angled wall 69 that effects alignment of the rotating tool 42 with the fastener 64 when the terminal end 70 of the locator engages frame 53. The guide 44 includes a flared circular opening 71 to assist in capturing the head of fastener 64 and directing it to rotating tool 42. Initial slow speed rotation of the tool 42 also facilitates capture. During this process, in effect, the tooling is permitted to float by the centering mechanism 41. As the rotating tool 42 drives the fastener 64 home, the guide retracts, compressing a spring that biases the guide outwardly along the rotating tool 42.

Figure 8:
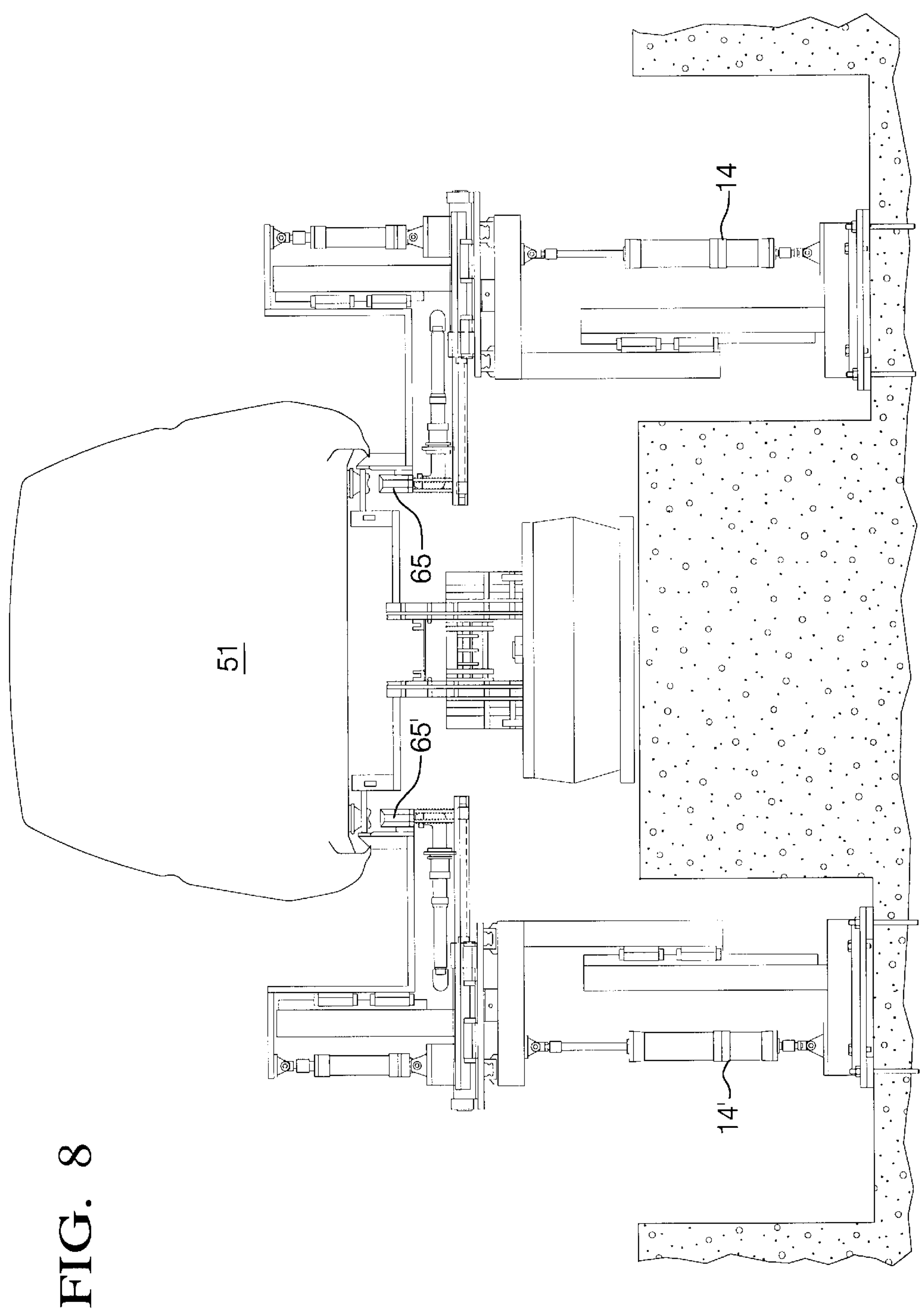
FIG. 8 is an illustration of the cab to frame marriage station of an ADAF apparatus shown in an operative stage of the marriage sequence with the fastener drivers retracted to the same position as shown in FIG. 6.
Figure 9:
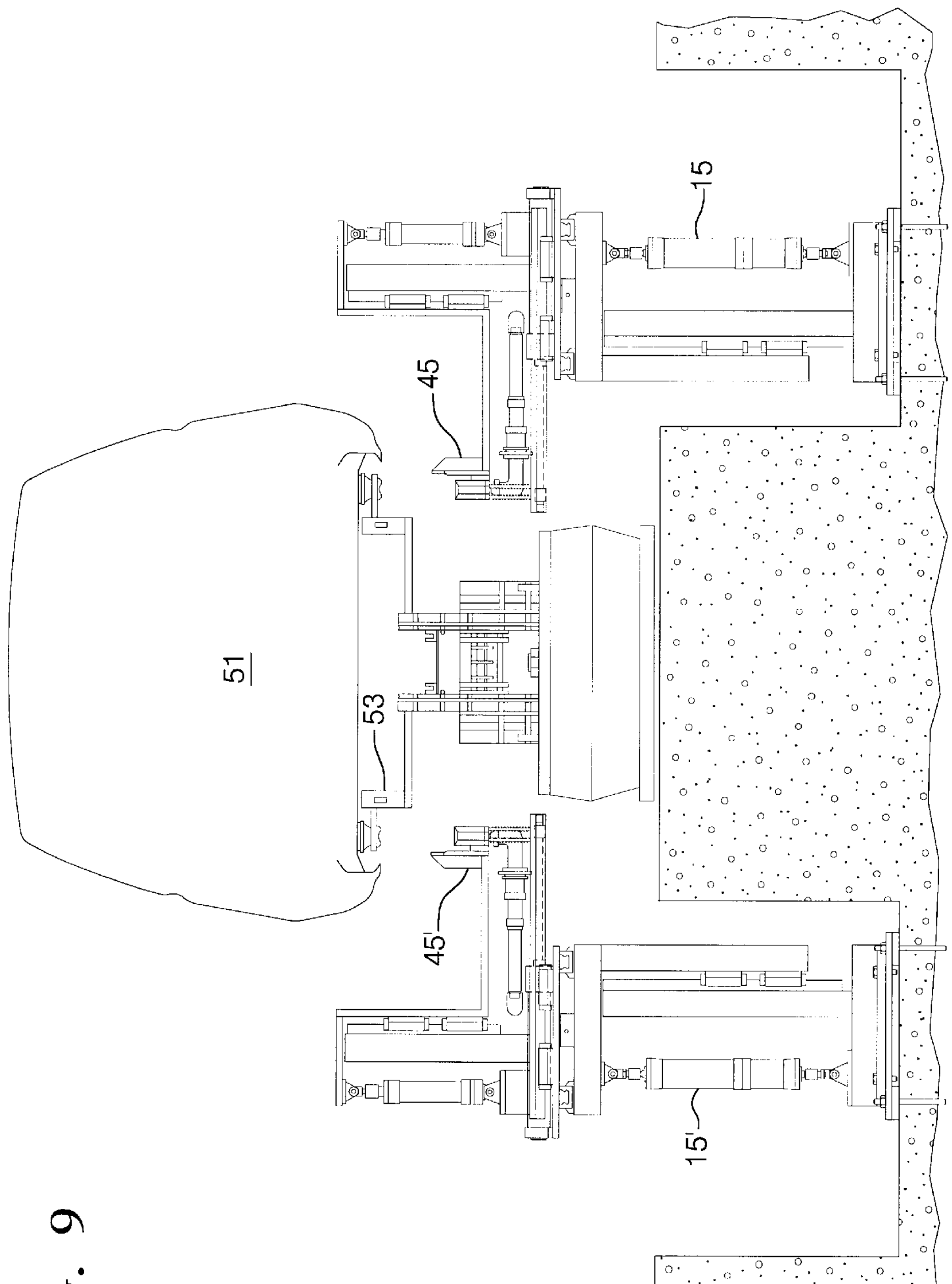
FIG. 9 is an illustration of the cab to frame marriage station of an ADAF apparatus shown in an operative stage of the marriage sequence with the elevatable units lowered to enable ADAF unit retraction while clearing the vehicle's rocker panel.
Figure 10:
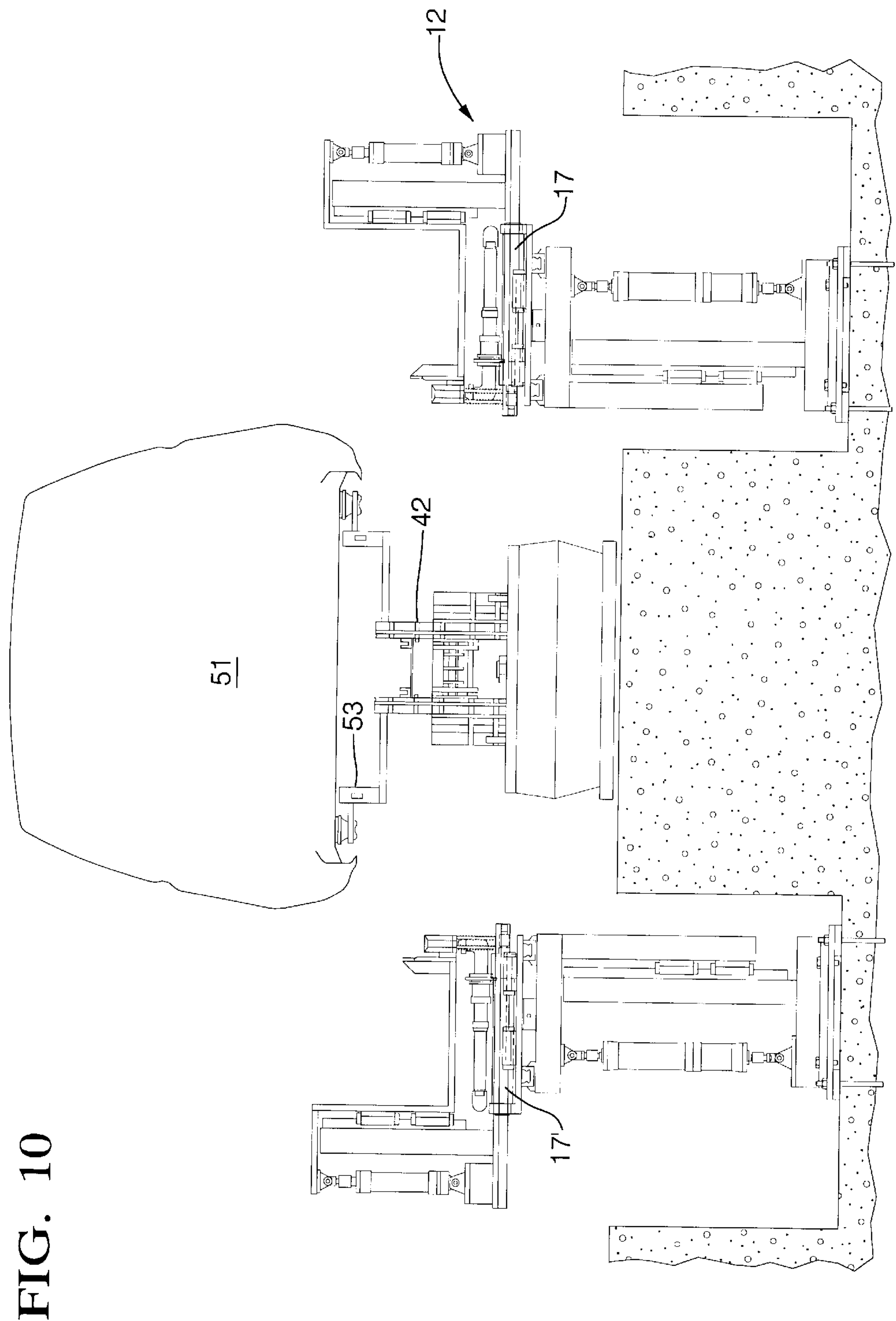
FIG. 10 is an illustration of the cab to frame marriage station of an ADAF apparatus shown in an operative stage of the marriage sequence wherein the slidable unit retracts to home position to allow the conveyor system to index the married cab and chassis out of station.

Continuing with reference to FIG. 8, cylinders 14, 14' retract, withdrawing the end effectors 65, 65'. Next, as shown in FIG. 9, cylinders 15, 15' retract, clearing the decking arms 45, 45' from the cab 51 and frame 53. Finally, the cross-car cylinders are unlocked and retracted as shown in FIG. 10, so that the ADAF units 11 and 12 are returned to their home positions and readied for another cycle of the ADAF system 10. The conveyor 52 moves the assembled cab 51 and frame 53 out from the automatic decking and fastening system marriage station.

Accordingly, automation of the process that decks and secures a vehicle body component to its chassis is provided that eliminates labor intensive operations previously associated with the marriage process.

What is claimed is:

1. An automatic vehicle component assembly for assembling a first vehicle component to a second vehicle component apparatus comprising:

a stationary base on a floor structure;

an elevatable unit supported on and repositionable relative to the base by at least a first actuator;

a slidable unit supported on the elevatable unit and repositionable relative to the elevatable unit by a second actuator;

an arm supported on the slidable unit and repositionable relative to the slidable unit by a third actuator wherein the arm includes a tooling plate near a terminal end of the arm that engages and supports the weight of the first vehicle component, and the arm is repositionable by a cylinder that extends between the slidable unit and arm;

a transfer unit positioned away from the base and movable relative to the base and carrying the first vehicle component; and a conveying unit positioned away from the base and the transfer unit movable relative to the base and the transfer unit and carrying the second vehicle component, wherein the second actuator positions the slidable unit against the second vehicle component and the transfer unit and the arm are cycled so that the first vehicle component is positioned on the arm in a spaced apart and predetermined position relative to the second vehicle component and at least one of the first and third actuators is operated to move the arm and position the first vehicle component on the second vehicle component.

2. An automatic vehicle component assembly apparatus according to claim 1 further comprising a fastener driver carried by the slidable unit having an aligned position determined by engagement of the slidable unit against the second vehicle component.

3. An automatic vehicle component assembly apparatus comprising:

a stationary base assembly;

a base plate omnipositionable relative to the base assembly by the action of a first actuator extending between the base assembly and the base plate operating in combination with a pair of bearings located between a vertical riser of the base assembly and a vertical leg of an elevatable unit;

a centering mechanism and a pair of longitudinal bearings positioned between the elevatable unit and the base plate engaging movement of the base plate in a longitudinal direction; and a pair of lateral bearings and a second actuator positioned between the elevatable unit and the base plate engaging movement of the base plate in a lateral direction that is perpendicular to the longitudinal direction;

a fastener driver carried by the base plate;

an arm supported on the base plate for vertical linear translation;

a transfer unit spaced away from the base assembly carrying a vehicle body component; and a conveyor spaced away from the base assembly and the transfer unit carrying a vehicle chassis component having a fastener thereon, wherein the base plate is moved to position the arm in a predetermined position relative to the chassis component and the transfer unit is moved to position the vehicle body component on the arm and the arm is translated linearly vertically to position the vehicle body component on the vehicle chassis component so that operation of the fastener driver engages and drives the fastener on the vehicle chassis component into the vehicle body component to secure the vehicle body component to the chassis component.

4. An automatic vehicle component assembly apparatus according to claim 3 wherein the first actuator comprises a pair of cylinders extending between the base assembly and the base plate wherein the pair of cylinders includes a first cylinder having a first extensible rod connected to the base assembly and a second cylinder having a second extensible rod connected to the base plate wherein when the second extensible rod is fully extended, extension of the first extensible rod further separates the base plate from the base assembly.

5. An automatic vehicle component assembly apparatus according to claim 3 further comprising an extensible cylinder carried by the base plate wherein extension of the cylinder vertically linearly translates the arm relative to the fastener driver.

6. An automatic vehicle component assembly apparatus according to claim 3 further comprising a guide associated with the fastener driver, wherein the guide includes a flared opening assisting in directing the fastener driver into position to engage and drive the fastener on the vehicle chassis component.

7. An automatic vehicle component assembly apparatus according to claim 3 further comprising a locator carried by the base plate at a fixed position relative to the fastener driver, wherein the locator engages the vehicle chassis component to align the fastener driver with the fastener on the vehicle chassis component.

8. An automatic vehicle component assembly apparatus according to claim 7 wherein the locator has an angled wall assisting in aligning the fastener driver with the fastener on the vehicle chassis component.

9. An automatic decking and automatic fastening system comprising:

a transfer unit carrying a vehicle body component;

a conveying unit carrying a vehicle chassis component; and a pair of automatic decking and automatic fastening units on opposite sides of the conveying unit and below the transfer unit, each including:

a stationary base assembly;

a platform elevatable relative to the base assembly by operation of a cylinder between the base assembly and the platform;

a base plate carried by the platform and slidable on a bearing toward and away from the conveying unit by an actuator between the base plate and the platform; and an arm elevatable relative to the base plate which receives the vehicle body component from the transfer unit and lifts the vehicle body component above and in a predetermined position relative to the vehicle chassis component and then lowers, placing the vehicle body component on the vehicle chassis component.

10. An automatic decking and automatic fastening system according to claim 9 further comprising a cylinder connected to the base plate and extendible to move the base plate toward and away from the conveying unit.

11. An automatic decking and automatic fastening system according to claim 10 wherein the bearing, the cylinder and the actuator in combination enable omnidirectional positioning of the base plate relative to the base assembly.

12. An automatic decking and automatic fastening system according to claim 9 further comprising a fastener driver carried by the base plate wherein the fastener driver is capable of securing the vehicle body component to the vehicle chassis component by rotating a fastener on the vehicle chassis component.

13. An automatic decking and automatic fastening system according to claim 12 further comprising a locator carried by the base plate at a fixed position relative to the fastener driver, wherein the locator engages the vehicle body component to align the fastener driver with the fastener prior to rotating the fastener to secure the vehicle body component to the vehicle chassis component.

14. An automatic decking and automatic fastening system according to claim 13 wherein the locator has an angled wall assisting in aligning the fastener driver with the fastener.

15. An automatic decking and automatic fastening system according to claim 14 further comprising a guide associated with the fastener driver, wherein the guide includes a flared opening receiving the fastener and assisting in directing the fastener driver into position to rotate the fastener.

16. An automatic decking and automatic fastening system according to claim 14 wherein the vehicle chassis component includes a frame with a bracket rigidly connected to the frame and wherein the locator initially engages the frame near the bracket by extension of the cylinder so that the fastener driver is misaligned with the fastener and wherein further extension of the cylinder causes the fastener driver to align with the fastener as the angled wall of the locator slides on the frame.

17. An automatic decking and automatic fastening system according to claim 9 wherein the vehicle chassis component carries a bracket and wherein the arm includes an ADAF plate supporting the vehicle body component when received by the arm and wherein prior to receiving the vehicle body component the arm is aligned by the ADAF plate engaging the bracket when the actuator is extended.

18. An automatic decking and automatic fastening system according to claim 17 further comprising a fastener driver carried by the base plate and having a rotatable tool positioned near the ADAF plate, wherein the fastener driver is capable of securing the vehicle body component to the vehicle chassis component by rotating a fastener on the vehicle chassis component into the vehicle body component.

* * * * *